United States Patent [19]

Mandelcorn et al.

[11] 4,266,264
[45] May 5, 1981

[54] META ISOPROPYL BIPHENYL INSULATED ELECTRICAL APPARATUS

[75] Inventors: Lyon Mandelcorn, Pittsburgh; Thomas W. Dakin, Murrysville, both of Pa.; George E. Mercier, Bloomington, Ind.

[73] Assignee: Westinghouse Electric Corp., Pittsburgh, Pa.

[21] Appl. No.: 809,589

[22] Filed: Jun. 24, 1977

[51] Int. Cl.³ .......................... H01G 4/22; H01B 3/22
[52] U.S. Cl. .................................... 361/318; 361/315; 361/319
[58] Field of Search ............... 361/315, 319, 327, 318; 252/63.7, 64

[56] References Cited

U.S. PATENT DOCUMENTS

| | | | |
|---|---|---|---|
| 3,275,914 | 9/1966 | Hoffman | 361/315 |
| 3,370,012 | 2/1968 | Robinson | 252/63.7 |
| 3,565,960 | 2/1971 | Schisla | 260/613 |
| 3,627,581 | 12/1971 | Phillips | 117/36.2 |
| 3,796,934 | 3/1974 | Munch | 361/319 |
| 3,948,788 | 4/1976 | Munch | 361/319 X |
| 4,054,937 | 10/1977 | Mandelcorn et al. | 361/319 |

Primary Examiner—Richard R. Kucia
Attorney, Agent, or Firm—R. D. Fuerle

[57] ABSTRACT

A capacitor is disclosed of layers of metal foil alternating with insulating sheets impregnated with a dielectric fluid. The dielectric fluid comprises isopropyl biphenyl of which at least about 55% by weight is the meta isomer. The dielectric fluid forms a glassy, amorphous phase at low temperatures rather than a crystalline solid.

14 Claims, 1 Drawing Figure

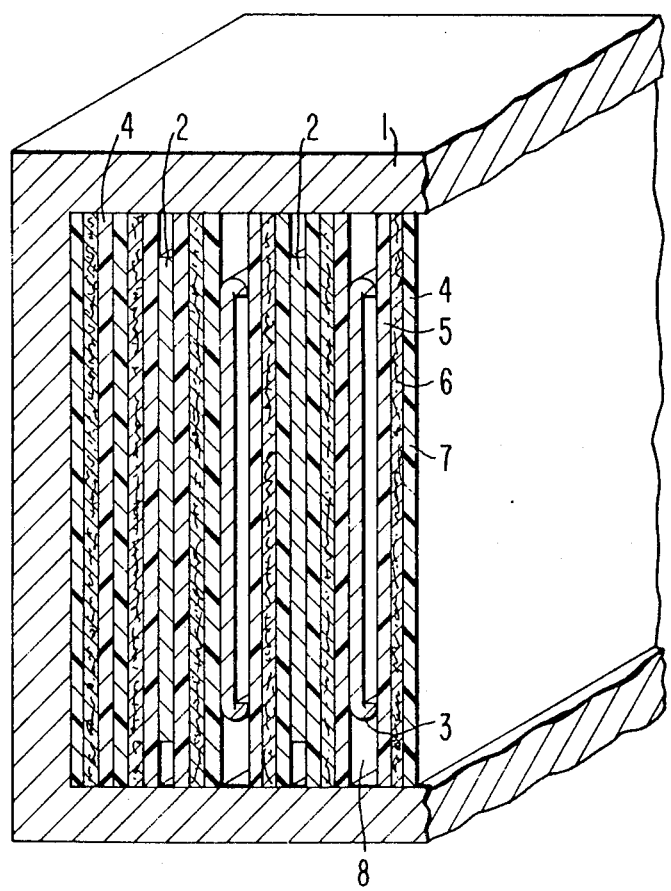

META ISOPROPYL BIPHENYL INSULATED ELECTRICAL APPARATUS

BACKGROUND OF THE INVENTION

The use of polychlorinated biphenyls as dielectric fluids, even in sealed electrical equipment, has become very restricted because they are alleged environmental pollutors, which is aggravated by their low biodegradability. Efforts during the past few years to develop dielectric fluids that could replace trichlorobiphenyl as the impregnant of polypropylene-film-paper and all paper capacitors and to be used with 100% film have been directed mostly at materials with aromatic groups. Highly aromatic fluids have been considered as alternates to permit continued operation of the capacitors a high voltages because they have good corona properties, and the operational voltages of a power capacitor depends on its resistance to corona generating overvoltages. Examples of potentailly good power capacitor fluids are solutions of a phthalate ester, diisononylphthalate, and an aromatic, solutions of an aromatic hydrocarbon and an aromatic sulfone, and isopropylnaphthalene, which is used in Japan.

These fluids are biodegradable, but do not have the excellent resistance to combustion, the "non-flammability," that polychlorinated biphenyls have. But their flash and fire points are as high as that of mineral oil which is widely used as an electrical insulating fluid. They would not be considered to be serious fire hazards in most power capacitors, which are usually mounted outdoors, and because of the small volume of fluid per unit, less than 3 gallons, the fire safety limit for such fluids (National Electric Code).

With film-paper or 100% film capacitors, emphasis must be directed at high operating stresses to achieve KVAR ratings, since the system dielectric constant cannot be altered very much by the dielectric constant of the impregnant. The KVAR rating is proportional to the product of the square of the operating voltage and the first power of the capacitance. In the film-paper dielectric the capacitance is only slightly affected by the dielectric constant of the impregnant, as it is dominated by the film, whose dielectric contstant is not changed much by the impregnant because only a small amount of fluid is absorbed by it. The average dielectric constant of a 75% film and 25% paper dielectric is decreased by only 10% by changing the impregnant from one with a relative dielectric constant of 4.9, trichlorobiphenyl, to one with 2.2 to 2.6, a hydrocarbon. On the other hand, for an impregnant that permits a modest fractional increase in operating voltage stress, the KVAR rating is increased by about twice that fractional voltage stress increase.

The level of the rated voltage stress is based on the expectation that a power capacitor will be subjected periodically to high overvoltages, due to switching and certain transients in the power lines, which are of the order of up to three times the rated voltage. It must resist in two ways the effects of such overvoltages, which generate corona discharges in the fluid. One restriction is that corona cannot persist, that it extinguishes, after the rated voltage is restored. Secondly, the corona at the overvoltage should not damage the dielectric and lead to early failure, before the 20 to 30 years of required operating life of the capacitor. Such effects in a capacitor may be gauged by its corona discharge inception and extinction voltages, which are determined by the nature of the impregnant, where the corona occurs, and a proper selection of capacitor dielectric spacer arrangements and foil electrode geometry.

It has not been clearly proven why aromatic fluids have relatively good corona properties, especially compared to aliphatics. Their good corona properties are evidenced by high capacitor corona discharge inception and extinction voltages, and relatively low gassing tendencies of the liquid under high voltage, in tests such as the modified Pirelli Gassing Test (ASTM D2300). Similar qualities are improved by additives, such as anthraquinones and epoxies. Regarding resistance to the effects of corona, high extinction voltage and low gassing, it is suggested that the aromatic molecules or the additives, such as mentioned hereinabove, react with the products of corona discharge, preventing build-up of gas bubbles of hydrogen and hydrocarbons at the original site of the corona, so that corona may not persist there. (A similar suggestion has been made about the high corona discharge extinction voltages with polychlorinated biphenyls, that their corona products, such as hydrogen chloride, are soluble or reactive.) This general explanation is not sufficient to present a systematic order of resistance to corona, and to use as a basis of selection of corona resistant fluids. As for the magnitude of the corona inception voltage, the molecular factors that affect it are also quite unclear.

PRIOR ART

U.S. Pat. No. 3,627,581 discloses isopropyl biphenyl, of which 65% is the meta isomer, as a dye carrier.

U.S. Pat. No. 3,796,934 discloses the use of isopropyl biphenyl in sulfones as a dielectric fluid for capacitors.

U.S. Pat. No. 3,275,914 discloses the use of monoisopropyl biphenyl as a dielectric fluid in a mica capacitor.

Japanese Utility Model applications 28516/74 (lay open number 117349/75) and 34141/74 (lay open number 117350/75) disclose the use of narrow foil with rounded edges alternating with straight foil in capacitors.

SUMMARY OF THE INVENTION

We have found that if the meta isomer of isopropyl bephenyl is at least 55% of an isopropyl biphenyl dielectric fluid, the fluid will not form a crystalline solid at low temperatures, but rather will form an amorphous, glassy phase. This would make capacitors with this impregnant suitable for operating temperatures below −40° C. With lesser concentrations of the meta isomer, the minimum satisfactory operating temperature will be higher. Unlike a crystalline solid, the glassy phase, which constitutes a super-cooled liquid, does not develop the discontinuities which lead to gas production, and consequent electrical breakdown. The capacitors have high corona inception and extinction voltages, typically about 7 KV at 25° C., for 1.5 mil polypropylene film plus 0.5 mil paper thickness, and very low power (or dissipation) factors. They are thermally stable over a large temperature range and can be operated at lower temperatures than capacitors comtaining trichlorobiphenyl or the capacitors of U.S. Pat. No. 4,054,937.

The dielectric fluid used in the capacitors is readily available, inexpensive, non-toxic, biodegradable, has a broad fluidity range, and is easily purified, if necessary.

Its flammability is acceptable and it is compatible with polypropylene, paper, and other dielectrics.

DESCRIPTION OF THE INVENTION

The accompanying drawing is a partial isometric sectional view of a certain presently preferred capacitor winding according to this invention.

In the drawing, a container 1 which is hermetically sealed holds one or more windings containing straight conducting foil 2 and a conducting foil 3 which is narrower and has rounded edges. These foils alternate with layers of insulation 4, here shown as film 5, paper 6, and film 7. A dielectric fluid 8, according to this invention, fills container 1 and impregnates the winding. Electrode terminations may be provided in accordance with conventional practice. Also, the dielectric layers will tend to conform to the spaces available so that in practice the large spaces shown in the drawing will be substantially reduced.

The dielectric fluid of this invention comprises isopropyl biphenyl which is at least about 55% (all percentages herein are by weight) meta isopropyl biphenyl. Preferably, the biphenyl dielectric fluid is about 55 to about 75% meta isomer because it is difficult and expensive to make isopropyl biphenyl with more than 75% meta ismoer. The dielectric fluid may contain up to 15% (based on total fluid weight) of di-isopropyl biphenyl without substantially adversely affecting the dielectric properties of the fluid in general, but actually improving resistance to crystallization at low temperatures. Preferably, the dielectric fluid contains about 3 to about 6% (based on total fluid weight) of di-isopropyl biphenyl because it is expensive to make a fluid with less than about 3% di-isopropyl biphenyl and when the amount of di-isopropyl biphenyl is more than about 6% corona properties show some deterioration.

Due to the method of preparation, the dielectric fluid may contain some biphenyl. Biphenyl is irritating and volatile, and therefore it is desirable that it not be present at more than 5% and preferably at less than 0.5%.

The dielectric fluid preferably includes up to about 1% of an anti-oxidant for thermal stability. The preferred amount is about 0.01 to about 0.2% and the preferred anti-oxidants are di-t-butyl-paracresol, di-t-butyl phenol, or mixtures thereof.

The fluid also preferably includes up to about 2%, and preferably about 0.1 to about 0.5%, of a hydrogen acceptor for improved corona resistance. An anthraquinone such as β-methylanthraquinone or anthraquinone may be used. Because it is readily available and more soluble β-methylanthraquinone is preferred.

The anti-oxidant and hydrogen acceptor seem to interact to produce a loss of corona resistance when either one is used at high concentrations. Therefore, preferably neither is used at more than 1%. A composition in which both are effective contains about 0.2% di-t-butyl-paracresol and about 0.5% β-methylanthraquinone.

Though not necessarily preferred, the fluid may include up to about 2%, and preferably about 0.05 to about 1 %, of an epoxy such as glycidyl phenyl ether or bis (3, 4-epoxy-6-methylcyclohexylmethyl adipate) for electrical stability.

The capacitors are preferably film (e.g., polypropylene)-paper or 100% film because, as hereinbefore explained, the dielectric constant of the fluid is not as important in these types of capacitors. The dielectric fluid of this invention may be used in transformers, cables, and other electrical apparatus as well as in capacitors.

The following examples further illustrate this invention.

EXAMPLE 1

Samples of fluids in 1 inch diameter by 6 inch long test tubes were cooled or cycled between two low temperatures in a Tenney Jr. Hot-Cold Chamber. A Plexiglas window permitted observation of the samples. The following table gives the percent of meta isomer, para isomer, and diisopropyl biphenyl in the fluids tested and the results of cooling the fluids for 18 hours at −37° C., and for an additional 16 hours at −47° C. All the fluids contained very little of the ortho isomer, generally only about 0.1%.

| Fluid | % meta | % para | % di-isopropyl biphenyl | Appearance After 18 hrs. at −37° C. | +16 hrs. at −47° C. |
| --- | --- | --- | --- | --- | --- |
| A* | 37.0 | 47.8 | 15.2 | mostly opaque translucent patches | all translucent |
| B | 40.3 | 51.3 | 6.1 | all whitish, opaque | mostly translucent opaque patches |
| C | 42.4 | 54.8 | 2.5 | " | all whitish, opaque |
| D | 42.6 | 52.6 | 3.5 to 4.0 | " | " |
| E | 44.3 | 51.8 | 3.7 | " | " |
| F | 48.0 | 46.3 | 4.0 to 4.5 | opaque and translucent patches | translucent |
| G | 57.1 | 36.9 | ~4 | all translucent | all translucent |

*Prepared from Fluid C plus 15% di-isopropyl biphenyl. All other fluids were as supplied. Fluids C, D, E, and G were supplied by Tanatex, Fluid F by Sunoco, and Fluid B by Pilot Chemical Co.

A whitish or opaque appearance indicates the formation of a crystalline solid. Such fluids may not be acceptable at this temperature because gas can be formed at the discontinuities in the crystalline solid where electric discharges can occur easily and lead to electrical breakdown. A translucent appearance indicates the formation of a super-cooled liquid, which is a glassy, amorphous, non-crystalline solid. The above table shows that only the fluid which was more than 55% meta isomer (Fluid G) formed a glassy solid. In Fluid A, the high portion of di-isopropyl biphenyl was of some aid in inhibiting crystallization, but it also raised the pour point. Crystallization apparently occurred more readily at the higher temperature, −37° C., rather than at −47° C. This crystallization is analogous to the devitrification of glass, which increases with temperature below the softening point.

EXAMPLE 2

In a similar experiment two samples of isopropyl biphenyl containing different amounts of the meta isomer (supplied by Tanatex) were mixed, cooled at −45°

C. for about 10 hours, and warmed to −25° C. The following table gives the results. The percentage of di-isopropyl biphenyl was about 2.5 to 3.5.

| Sample | % meta | % para | Observation at −25° C. |
|---|---|---|---|
| A | 56.6 | 38.5 | All clear |
| 80% A-20% B | 53.0 | 42.7 | ½ clear, ½ opaque |
| 60% A-40% B | 50.4 | 45.6 | All opaque |
| 40% A-60% B | 47.4 | 48.9 | All opaque |
| 20% A-80% B | 44.2 | 52.7 | All opaque |
| B | 41.4 | 55.6 | All opaque |

Such temperature cycling, and as shown in the following examples, reflects actual low temperature ambient exposures of power capacitors.

EXAMPLE 3

In a similar experiment various samples of isopropyl biphenyl were cooled to −60° C. for 2 hours, then warmed to −15° C. for 1 hour and checked for solidification. The following table gives the results:

| % meta | % para | % di | Observation |
|---|---|---|---|
| 26.4 | 71.2 | ~2 | All solid |
| 39.9 | 49.6 | ~9 | ¼ inch liquid (flow on top restricted) |
| 41.4 | 55.6 | ~2 | Mostly solid throughout, some liquid on top |
| 52.3 | 42.3 | 3.5 | Solid |
| 56.6 | 38.5 | ~3 | Clear, flowed |
| 65.2* | 26.7 | — | Clear, flowed |
| 73.0 | 17.8 | — | Clear |

*from fluids containing 73.0% and 26.4% meta.

EXAMPLE 4

In a similar experiment various samples of isopropyl biphenyl were cooled to −30° C. for 7 hours, then to −40° C. for 2 hours, −30° C. for 1 hours, −40° C. for 2 hours, −30° C. for 1 hour, −40° C. for 3 hours, then observed. After a further cycling time at −50° C. for 2 hours and 1 hour at −30° C., the samples were observed again after 2 more hours at −50° C. Finally, they were similarly cycled, twice at −60° C. ±3° C. for 2 hours and 1 hour at −30° C., and were observed again after two more hours at −60° C. The following table gives the results:

| % meta | % para | % di | At −40° C. | Observations At −50° C | At −60° C. |
|---|---|---|---|---|---|
| 26.4 | 71.2 | ~2 | Crystallized | Same | Same |
| 39.9 | 49.6 | ~9 | Some crystals on walls | More crystals | Crystals |
| 41.4 | 55.6 | ~2 | Crystallized | Same | Same |
| 52.3 | 42.3 | 3.5 | Some crystals on walls | More crystals | Wall almost covered with crystals |
| 56.6 | 38.5 | ~3 | Hazy clear | Same | Same |
| 65.2* | 26.7 | — | Clear | Clear | Clear |
| 73.0 | 17.8 | — | Clear | Clear | Clear |

*from fluids containing 73.0% and 26.4% meta.

EXAMPLE 5

In a similar experiment samples of isopropyl biphenyl were cooled to −27° C., for one hour, observed, kept at −27° C. for an additional 18 hours, observed, cooled to −60° C. for 2 hours, warmed to −31.5° C. for one hour, observed, cooled to −60° C. for two hours, observed. The following table gives the results:

| % meta | % para | % di | 1 hr. at −27° C. | 18 hrs. at −27° C. | −31.5° C. | 7 hrs. at −60° C. | 2 hrs. at −60° C. |
|---|---|---|---|---|---|---|---|
| 26.4 | 71.2 | ~2 | much solid | much solid | solid | same | same |
| 39.9 | 49.6 | ~9 | clear | solid at bottom | same | more solid | same |
| 41.4 | 55.6 | ~2 | some solid spots | all solid | all solid | same | same |
| 52.3 | 42.3 | 3.5 | clear | foggy, translucent flowed | same, 1 piece of solid | same, slight flow | same |
| 56.6 | 38.5 | ~3 | clear | foggy, translucent flowed | same | same | same |
| 65.2* | 26.7 | — | clear | clear, flowed | clear, some fog | same, slight | same |
| 73.0 | 17.8 | — | clear | clear, flowed | same, some fog | same, slight flow | same |

*from fluids containing 73.0% and 26.4% meta.

I claim:

1. A capacitor comprising layers of metal foil alternating with a dielectric spacer impregnated with a dielectric fluid which comprises isopropyl biphenyl of which at least 55% by weight is the meta isomer.

2. A capacitor according to claim 1 wherein said dielectric fluid includes up to 15% by weight di-isopropyl biphenyl based on total dielectric fluid weight.

3. A capacitor according to claim 2 wherein said dielectric fluid includes about 3 to about 6% by weight diisopropyl biphenyl based on total dielectric fluid weight.

4. A cpapcitor according to claim 1 wherein about 55 to about 75% by weight of said isopropyl biphenyl is the meta isomer.

5. A capacitor according to claim 1 wherein said dielectric fluid contains up to about 1% by weight of an aanti-oxidant and up to about 2% by weight of a hydrogen acceptor compound.

6. A capacitor according to claim 1 wherein said dielectric fluid contains about 0.01 to about 0.5% by weight of an anti-oxidant selected from the group consisting of di-t-butyl paracresol, di-t-butyl phenol, and mixtures thereof.

7. A capacitor according to claim 1 which contains up to 2% of a hydrogen acceptor compound.

8. A capacitor according to claim 7 wherein said dielectric fluid contains about 0.1 to about 0.5% by weight of an anthraquinone compound.

9. A capacitor according to claim 8 wherein said anthraquinone compound is β-methylanthraquinone.

10. A capacitor according to claim 1 wherein said dielectric fluid includes about 0.05 to about 2% of an epoxy.

11. A capacitor according to claim 1 wherein said dielectric spacer consists of paper and film, or 100% film.

12. A capacitor according to claim 1 wherein every other layer of said metal foil is narrower.

13. A capacitor according to claim 12 wherein each layer of metal foil which is narrower has rounded edges.

14. An electrical apparatus containing a dielectric fluid which comprises isopropyl biphenyl of which at least 55% is the meta isomer.

* * * * *